US011215436B2

(12) United States Patent
Huang et al.

(10) Patent No.: US 11,215,436 B2
(45) Date of Patent: Jan. 4, 2022

(54) MEASURING THE LENGTH OF A WEAR INDICATOR

(71) Applicant: Honeywell International Inc., Morris Plains, NJ (US)

(72) Inventors: Hua Huang, Shanghai (CN); Braxton Felts, Osceola, IN (US); Dennis Norman Oswell Dalton, Boksburg (ZA); Qixiang Li, Beijing (CN); Dinkar Mylaraswamy, Phoenix, AZ (US); Matthew Arend, South Bend, IN (US); Joshua Allen Moore, South Bend, IN (US)

(73) Assignee: Honeywell International Inc., Charlotte, NC (US)

( * ) Notice: Subject to any disclaimer, the term of this patent is extended or adjusted under 35 U.S.C. 154(b) by 245 days.

(21) Appl. No.: 16/532,698

(22) Filed: Aug. 6, 2019

(65) Prior Publication Data
US 2020/0149860 A1   May 14, 2020

Related U.S. Application Data

(60) Provisional application No. 62/757,426, filed on Nov. 8, 2018.

(51) Int. Cl.
| | | |
|---|---|---|
| *G01B 5/00* | (2006.01) | |
| *F16D 66/02* | (2006.01) | |
| *G01B 5/06* | (2006.01) | |
| *G01L 17/00* | (2006.01) | |

(52) U.S. Cl.
CPC ........... *G01B 5/0028* (2013.01); *F16D 66/02* (2013.01); *G01B 5/06* (2013.01); *G01L 17/005* (2013.01)

(58) Field of Classification Search
None
See application file for complete search history.

(56) References Cited

U.S. PATENT DOCUMENTS

| | | | | |
|---|---|---|---|---|
| 4,658,936 A | * | 4/1987 | Moseley | F16D 55/40 116/208 |
| 5,967,266 A | * | 10/1999 | Carnegie | B60T 17/08 188/1.11 L |
| 6,237,723 B1 | * | 5/2001 | Salsman | F16D 66/00 188/1.11 W |
| 7,108,107 B2 | | 9/2006 | Ralea et al. | |
| 7,552,627 B2 | * | 6/2009 | Canterbury | G01B 5/0028 188/1.11 W |

(Continued)

OTHER PUBLICATIONS

Notice of Intent to Grant and Text Intended to Grant from counterpart European Application No. 19207319.5, dated Jan. 27, 2021, 35 pp.

(Continued)

*Primary Examiner* — Freddie Kirkland, III
(74) *Attorney, Agent, or Firm* — Shumaker & Sieffert, P.A.

(57) ABSTRACT

In some examples, a device can be used for measuring a length of a wear indicator on a brake assembly. The device includes a moveable component configured to move based on contact with the wear indicator. The device also includes a sensor configured to detect a displacement of the moveable component. The device further includes processing circuitry configured to determine the length of the wear indicator based on the displacement of the moveable component detected by the sensor.

18 Claims, 6 Drawing Sheets

(56) References Cited

U.S. PATENT DOCUMENTS

| | | | |
|---|---|---|---|
| 7,766,130 B2 | 8/2010 | Walker et al. | |
| 8,152,246 B2 | 4/2012 | Miller et al. | |
| 8,201,666 B2 | 6/2012 | DeVlieg | |
| 8,464,842 B2 * | 6/2013 | Cahill | F16D 66/026 |
| | | | 188/1.11 L |
| 8,578,766 B2 | 11/2013 | Canterbury et al. | |
| 8,634,971 B2 | 1/2014 | Cahill | |
| 8,717,159 B2 | 5/2014 | Todd et al. | |
| 8,827,046 B2 * | 9/2014 | Cahill | F16D 66/026 |
| | | | 188/1.11 L |
| 9,086,301 B2 | 7/2015 | Erickson et al. | |
| 9,441,692 B2 | 9/2016 | Schaefer | |
| 9,482,301 B2 | 11/2016 | Lamkin et al. | |
| 9,506,516 B2 | 11/2016 | Troester et al. | |
| 9,616,558 B2 * | 4/2017 | Nishikawa | B25B 23/1475 |
| 9,786,042 B2 | 10/2017 | Venkatesha et al. | |
| 9,897,426 B2 * | 2/2018 | Wu | G01B 5/14 |
| 10,471,947 B1 * | 11/2019 | Sheriff | G01B 17/00 |
| 10,800,387 B1 | 10/2020 | Georgin | B60T 8/1703 |
| 10,941,826 B2 * | 3/2021 | Muniraju | G01D 5/16 |
| 2007/0251308 A1 | 11/2007 | Canterbury et al. | |
| 2010/0206671 A1 | 8/2010 | Cahill | |
| 2012/0027585 A1 | 2/2012 | Daniels et al. | |
| 2012/0199372 A1 * | 8/2012 | Nishikawa | B25B 23/1475 |
| | | | 173/132 |
| 2015/0286215 A1 | 10/2015 | Alvarado, Jr. et al. | |
| 2016/0281808 A1 | 9/2016 | Lamkin et al. | |
| 2018/0290639 A1 | 10/2018 | Dirgo et al. | |
| 2018/0370656 A1 | 12/2018 | Arribe | |
| 2019/0056008 A1 | 2/2019 | Wilkes et al. | |
| 2019/0329755 A1 * | 10/2019 | Sheriff | F16D 66/028 |
| 2020/0080609 A1 * | 3/2020 | Muniraju | G01D 5/42 |

OTHER PUBLICATIONS

Extended Search Report from counterpart European Application No. 19207319.5, dated Apr. 6, 2020, 7 pp.

Response to Extended Search Report dated Apr. 6, 2020, from counterpart European Application No. 19207319.5, filed Apr. 21, 2020, 15 pp.

Cable, "How Much Wear Do I Have Left On My Aircraft's Brake?," Duncan Aviation, May 2018, 3 pp.

U.S. Appl. No. 15/964,279, filed by Shajahan Sheriff et al., filed Apr. 27, 2018.

U.S. Appl. No. 16/129,316, by Honeywell International Inc. (Inventors: Muniraju, Raghavendra et al.), filed Sep. 12, 2018.

* cited by examiner

MEASURING THE LENGTH OF A WEAR INDICATOR

This application claims the benefit of U.S. Provisional Patent Application Ser. No. 62/757,426 (filed Nov. 8, 2018), which is incorporated by reference herein in its entirety.

TECHNICAL FIELD

The disclosure relates to vehicle brake systems.

BACKGROUND

During periodic maintenance, the amount of wear on a vehicle's braking assembly is manually assessed by a maintenance technician. On an aircraft, for example, the remaining use of the braking assembly is determined by observing the length of a wear indicator, also known as a wear pin or a brake wear pin.

SUMMARY

In some examples, a device is configured to measure a length of a wear indicator on a brake assembly. The device includes a moveable component configured to move based on contact with the wear indicator. The device further includes a sensor configured to detect a displacement of the moveable component. The device also includes processing circuitry configured to determine the length of the wear indicator based on the displacement of the moveable component detected by the sensor.

In some examples, a device is for measuring a length of a wear indicator on a brake assembly. The device includes a moveable component configured to move based on contact with the wear indicator. The device also includes a sensor configured to detect a displacement of the moveable component. The device further includes processing circuitry configured to determine the length of the wear indicator based on the displacement of the moveable component detected by the sensor.

In some examples, a device includes means for measuring a length of a wear indicator on a brake assembly. The device also includes means for moving based on contact with the wear indicator and means for detecting a displacement of the moveable component. In addition, the device includes means for determining the length of the wear indicator based on the displacement of the moveable component detected by the sensor.

The details of one or more examples of the techniques of this disclosure are set forth in the accompanying drawings and the description below. Other features, objects, and advantages of the techniques will be apparent from the description and drawings, and from the claims.

DETAILED DESCRIPTION

Figure 1:
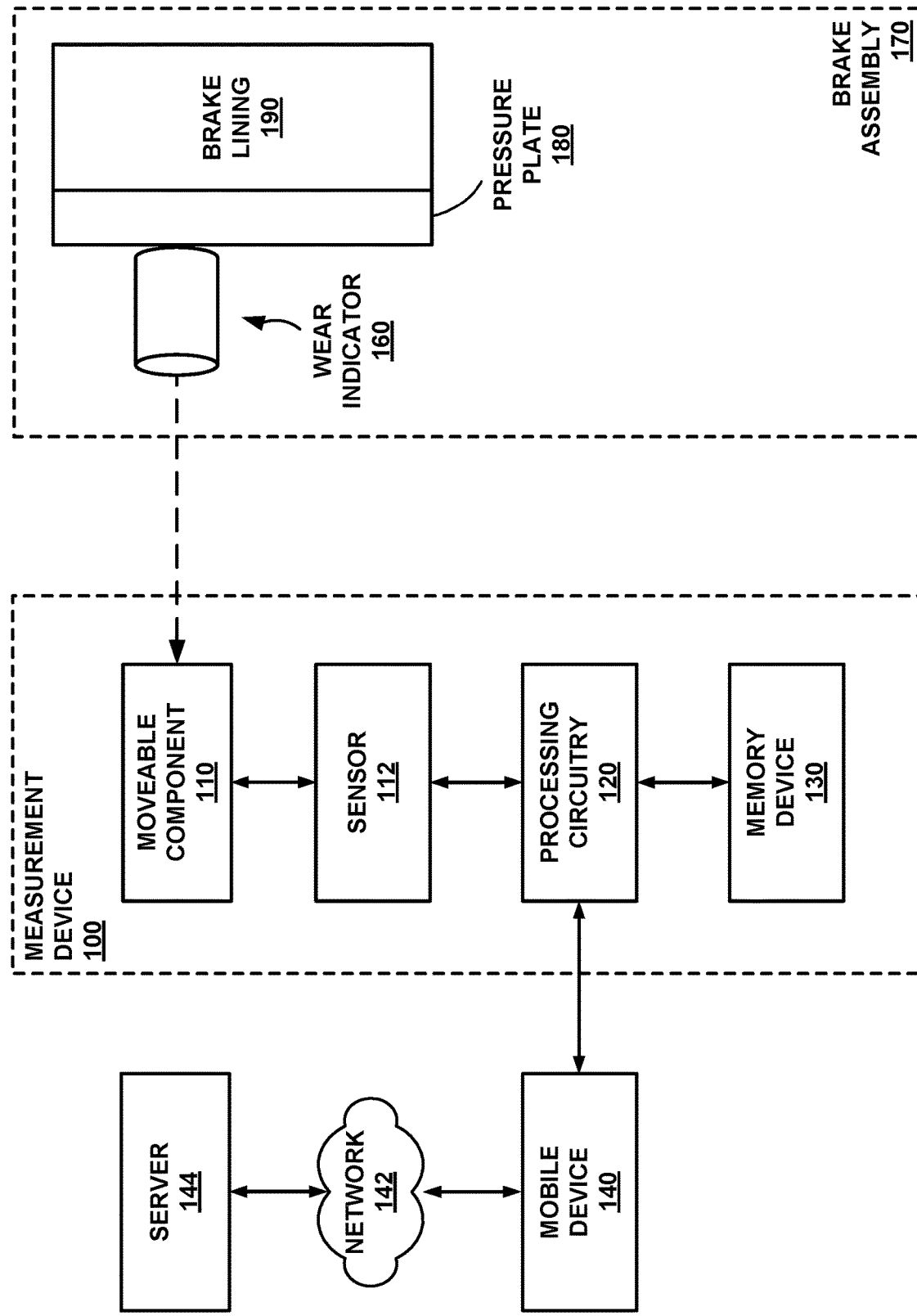
FIG. 1 is a diagram depicting a device for measuring the length of a wear indicator in the brake assembly, in accordance with some examples of this disclosure.

This disclosure describes devices, methods, and techniques for determining a length of a wear indicator (e.g., a wear pin indicator, a wear pin, and/or a brake wear pin). The wear indicator may be part of a system such as a brake assembly, a tire, or any other system in which wear can occur on a mechanical component, such as a brake lining on a vehicle wheel. A measurement device of this disclosure operates as a means of measuring the brake wear in a vehicle. The measurement device may be a handheld device that can measure the length of a wear indicator and transmit data to a mobile device (e.g., a cellular phone, tablet, or laptop computer). The measurement device may also be configured to transmit the data to a mobile computing device or a server automatically and/or simultaneously or in near real-time with the measurement. This disclosure will generally describe the measurement device and computing device, but it should be understood that in some implementation, functionality ascribed to the computing device may partially, or entirely, be performed by the measurement device. The techniques of this disclosure can significantly reduce the workload of a technician.

In the example of an aircraft, the carbon brake wear in a brake assembly can be significantly related to the times of landing and taxi of the aircraft. For example, brake overhaul facilities may charge brake assembly overhaul fees to aircraft operators based on the number of landings for the aircraft. To improve the usage of carbon brakes, it is important to precisely measure the brake wear. A computing system with access to the wear data can forecast the remaining landing times based on factors, such as landing conditions, historical wear rates, and the type of brakes. If a manufacturer has access to the wear data and remaining landing time for brakes that are under a maintenance service agreement, the manufacturer can increase the readiness of both the supply chain and the manufacturing of replacement parts. In addition, accurate measurement and uploading of the data can reduce the cost of overhaul because of improved forecasting of replacement times.

A device of this disclosure can be used as ground support equipment for ground crew performing maintenance on aircraft. Performing a quick and accurate measurement of a wear indicator for a brake assembly is especially important for aircraft because the owner of the aircraft (e.g., airline or military) may want to put the aircraft back in the air as quickly as possible. A portable, cordless, and handheld device implementing the techniques of this disclosure allows the ground crew to quickly and accurately measure the length of the wear indicator, even in tight spaces or low-light conditions.

For other methods of assessing the length of a wear indicator, a technician may have to manually measure the length of the wear indicator (e.g., using a ruler, caliper, or another manual measurement tool). Using another method, the technician may need to record the length using a pen and paper and then manually enter the data into a computing device. Environmental conditions (e.g., temperature, wind, and precipitation), light conditions, and the eyesight of the technician can negatively affect the accuracy of the measurement and recording of the length of the wear indicator.

Thus, the techniques of this disclosure may enable a technician to more easily and accurately determine, analyze, and upload the length of the wear indicator.

Brake lining material is made to wear as it causes friction during application of the brakes. The wear may be monitored to ensure that the brake lining does not wear down beyond a limit and to ensure that sufficient lining is available for effective braking. A manufacturer may publish specifications for lining wear in the maintenance information for a brake assembly. The amount of wear can be checked at the time of installation of the brakes. A carbon brake assembly can include a built-in wear indicator. The length of the wear indicator is a measure or proxy for brake wear to determine how much wear is remaining for the heat sink (e.g., the brake lining). The exposed length of the wear indicator decreases as the linings wear down, and a technician may use a minimum length to determine that the brake lining should be replaced.

In the example of a brake assembly including a wear indicator for the brake lining, the brakes are typically replaced when the wear indicator is flush or nearly flush with a surface of the brake housing. An inaccurate measurement of the length of wear indicator may lead to replacing the brakes too early or too late. Thus, the brakes may not be used to the fullest extent of their remaining use (e.g., remaining life or remaining lifespan). For some braking systems, one-tenth of one inch of length on the wear indicator may last approximately one hundred braking events.

A measurement device of this disclosure may generate more accurate notifications of the length of a wear indicator, as compared to manually measuring and recording the length of the wear indicator. Accurate measurements can allow maintenance workers to increase the useful life of a mechanical component, without the risk of replacement of the mechanical component being postponed too long. Once the data is received by a computing device, processing circuitry on the computing device can analyze the obtained data to determine trends for prognosis of the remaining use of the mechanical component.

This technique for recording and uploading the length of the wear indicator may not require human intervention because the processing circuitry may be configured to output an indication of the estimated remaining use and/or the length of the wear indicator. The processing circuitry can determine the length of the wear indicator and transmit data automatically and more quickly than other brake wear devices. This measurement device may enable a vehicle operator, through a computing system located in an avionics bay, to apply algorithms on the measured data and predict the wear remaining on a brake assembly and plan for maintenance more efficiently.

FIG. 1 is a diagram depicting a device 100 for measuring the length of a wear indicator 160 in brake assembly 170, in accordance with some examples of this disclosure. Measurement device 100 (e.g., "device 100") includes moveable component 110, sensor 112, processing circuitry 120, and memory device 130. Device 100, or any other device described in this disclosure, can be a handheld or portable device. Device 100 can be used as ground support equipment for ground crew to determine the length of wear indicator 160. Device 100 may be a cordless device that is powered by a battery. Brake assembly 170 includes wear indicator 160, pressure plate 180, and brake lining 190. Various examples in this disclosure will be described with respect to measuring the brake wear pin for an aircraft braking systems, but it should be understood that the devices and techniques described herein are not necessarily limited to aircraft and may be used for measuring the wear pins of other types of breaking systems as well, including other types of vehicles.

Moveable component 110 is configured to move based on contact with wear indicator 160. For example, wear indicator 160 may contact and push moveable component 110 back into device 100. Contact with wear indicator 160 can cause moveable component 110 to deflect or displace. Moveable component 110 may include one or more bearings, rollers, pistons, sliders, springs, tubes, tracks, and/or any other mechanical component configured to move based on contact with wear indicator.

Sensor 112 may be configured to sense or detect displacement of moveable component 110. Sensor 112 can output a signal (e.g., a voltage signal or a current signal) that indicates the displacement of moveable component 110. Sensor 112 may include a linear variable differential transformer (LVDT), a linear potentiometer, a digital caliper, a pressure sensor, a Hall sensor, a magnetic sensor, a magnetoresistive sensor, an ultrasonic sensor, a laser, a piezoelectric sensor, a transceiver, and/or any other type of sensor configured to detect the displacement of moveable component 110.

In examples in which sensor 112 includes a pressure sensor, sensor 112 may be configured to output the signal based on the compression or expansion of moveable component 110. In examples in which sensor 112 includes a linear displacement sensor (e.g., an LVDT), sensor 112 may be configured to output the signal based on displacement of a moveable rod of sensor 112. In examples in which sensor 112 includes a linear displacement sensor, moveable component 110 (e.g., a spring) may be configured to return the moveable rod of sensor 112 to a starting position.

Processing circuitry 120 may be configured to determine the length of wear indicator 160 based on the displacement of moveable component 110 detected by sensor 112. In some examples, the length of wear indicator 160 remains constant throughout operation of brake assembly 170, but the exposed length of wear indicator 160 changes as brake lining 190 wears down. Thus, device 100 may be configured to measure the exposed length of wear indicator 160, rather than the full length of wear indicator 160.

Processing circuitry 120 may be configured to determine the length of wear indicator 160 using a lookup table or algorithm that converts a signal generated by sensor 112 to an estimated length of wear indicator 160. Processing circuitry 120 can store the lookup table stored in memory device 130. Processing circuitry 120 can apply the algorithm or function to the signal generated by sensor 112 using instructions stored to memory device 130. Processing circuitry 120 may be configured to store data indicating the determined length of the wear indicator 160 to memory device 130.

Processing circuitry 120 may be configured to transmit or upload the data indicating the determined length of the wear indicator 160 to memory device 130 to mobile device 140. Along with the determined length, processing circuitry 120 may also be configured to transmit a timestamp indicative of the time at which the length was measured. Additionally or alternatively, processing circuitry 120 can store the data to memory device 130 and transmit the data to mobile device 140 at a later time.

Processing circuitry 120 can use a wired or wireless connection to transmit the data to mobile device 140. The wired connection may include wires, fiber-optic cable, universal serial bus (USB), a secure digital (SD) card, a thumb drive, an external hard drive, and/or any other wired connection. The wireless connection may include Bluetooth, Wi-Fi, cellular network communication, radio-frequency (RF) communication, RF identification (RFID), near-field communication (NFC), or any other electromagnetic signals. Processing circuitry 120 can transmit the data to mobile device 140 simultaneously or in near real-time with the measurement of wear indicator 160.

Processing circuitry 120 may be configured to transmit data indicating the length of wear indicator 160 to mobile device 140. Mobile device 140 may include a smartphone, tablet, laptop computer, microcontroller, and/or any other mobile computing device. Mobile device 140 can communicate with server 144 through network 142. Server 144 may be a remote computing device. In some examples, processing circuitry 120 can transmit the data directly to network 142 and/or directly to server 144.

The following description of analyzing and processing the determined length of wear indicator 160 may be performed on device 100 by processing circuitry 120 or by an external computing device. In some examples, processing circuitry 120 or the external computing device can determine the remaining use of the brake assembly based on the length of wear indicator 160. Processing circuitry 120 may divide the length by an estimate of the wear (e.g., reduction in length) per braking event to determine the remaining use. Processing circuitry 120 can use the specifications for the brake assembly to determine the estimate of wear per braking event (e.g., rate of wear). Alternatively or additionally, processing circuitry 120 can use measurements of the length of wear indicator 160, along with the number of braking events between measurements, to determine the estimate of wear per braking event.

Processing circuitry 120 or the external computing device may further be configured to retrieve from memory device 130 or an external memory device a previous set of wear indicator length and time data and use the data in conjunction with a current measurement in order to determine a rate of change of the length of wear indicator 160 during the time between which the different measurements were conducted. Processing circuitry 120 may then transmit the rate of change data to be stored in memory device 130 along with the length and time data. Processing circuitry 120 may determine if the length of the wear indicator is less than a threshold length and generate an alert in response to determining that the length of the wear indicator is less than the threshold length. Such an alert may be an audio alert, such as a recorded verbal message or a tone, or alternatively or additionally, a visual alert, such as a light, displayed phrase, message, symbol, or color.

In some examples, processing circuitry 120 may perform data analysis on the data indicating the length of wear indicator 160. For example, processing circuitry 120 may use data indicating the number of braking events, the weather conditions during each braking event, the vehicle operator during each braking event, the type of surface for each braking event (asphalt, concrete, etc.), and/or any other data stored to memory device 130 or an. Processing circuitry 120 may determine metrics such as the rate of wear and the estimated remaining use of wear indicator 160. Processing circuitry 120 may also determine when and whether to generate alerts regarding the status of wear indicator 160 and/or the brake assembly. Alternatively or additionally, processing circuitry 120 may output the data to an external computing system, such as the avionics bay of an aircraft, to perform the data analysis on data relating to wear indicator 160 and/or the brake assembly.

Memory device 130 is a non-transitory computer-readable medium capable of storing the length of wear indicator 160 along with a timestamp indicating the time at which the measurement was made. Memory device 130 may be further configured to store multiple sets of length and time data, as well as rates of change of the length of wear indicator 160 between subsequent measurements. Memory device 130 may also store threshold lengths and threshold distances that processing circuitry 120 may use to determine if wear indicator 160 is approaching an end of useful life. In some examples, memory device 130 stores data relating to braking events, such as a measurement conducted when the brakes are applied, and weather or climate conditions. Memory device 130 can also store a lookup table or algorithm for processing circuitry 120 to convert a signal generated by sensor 112 to an estimated length of wear indicator 160.

Wear indicator 160 is a component whose exposed length represents the remaining use (e.g., remaining lifespan) of brake assembly 170. In some examples, when the tip of wear indicator 160 is flush with a housing, the vehicle's brakes may need replacement due to excessive wear. Wear indicator 160 may have any suitable shape, such as a cylinder, a cone, or a rectangle, where the length of wear indicator 160 may decrease over time. As a cylinder, wear indicator 160 may have a radius of a few millimeters and a maximum length of one, two, three, or more inches. Wear indicator 160 can also include a material layer, a coating, and/or a covering that indicates the wear of brake assembly 170.

Brake assembly 170 may include braking elements for slowing the speed of rotation of vehicle wheels, such as automobile wheels or aircraft landing gear. Brake assembly 170 may be mounted to or built in to the wheels. Device 100 may be mounted to a part of the brake assembly, such as a brake housing. Brake assembly 170 may also be referred to herein as a "braking system." As used herein, the term "the remaining use of brake assembly 190" may refer to the remaining use of brake lining 190.

Brake lining 190 may press against a rotating component of a wheel to reduce the speed of the rotating component. When the brakes are applied during a braking event, a stationary hydraulic system can push or displace pressure plate 180 against brake lining 190 thereby generating friction between the stationary pads of brake lining 190 and the rotating component, such as a wheel disc. The friction between the pads of brake lining 190 and the rotating component causes the rotation of the wheel to decline. Brake lining 190 may be the active portion of braking assembly 170 that wears down over time due to braking events.

Additional example details of detecting brake wear may be found in commonly assigned U.S. patent application Ser. No. 15/964,279, filed on Apr. 27, 2018, entitled "Determining Estimated Remaining Use of Brake Assembly by Transceiver," commonly assigned U.S. patent application Ser. No. 16/129,316, filed on Sep. 12, 2018, entitled "Determining Estimated Remaining Use of Brake Assembly," commonly assigned U.S. Pat. No. 9,482,301 issued on Nov. 1, 2016, entitled "Brake Disc Stack Wear Measurement," and commonly assigned U.S. Pat. No. 944,192 issued on Sep. 13, 2016, entitled "Proximity Sensor for Brake Wear Detection," which are incorporated herein by reference in their entirety.

Figure 2:
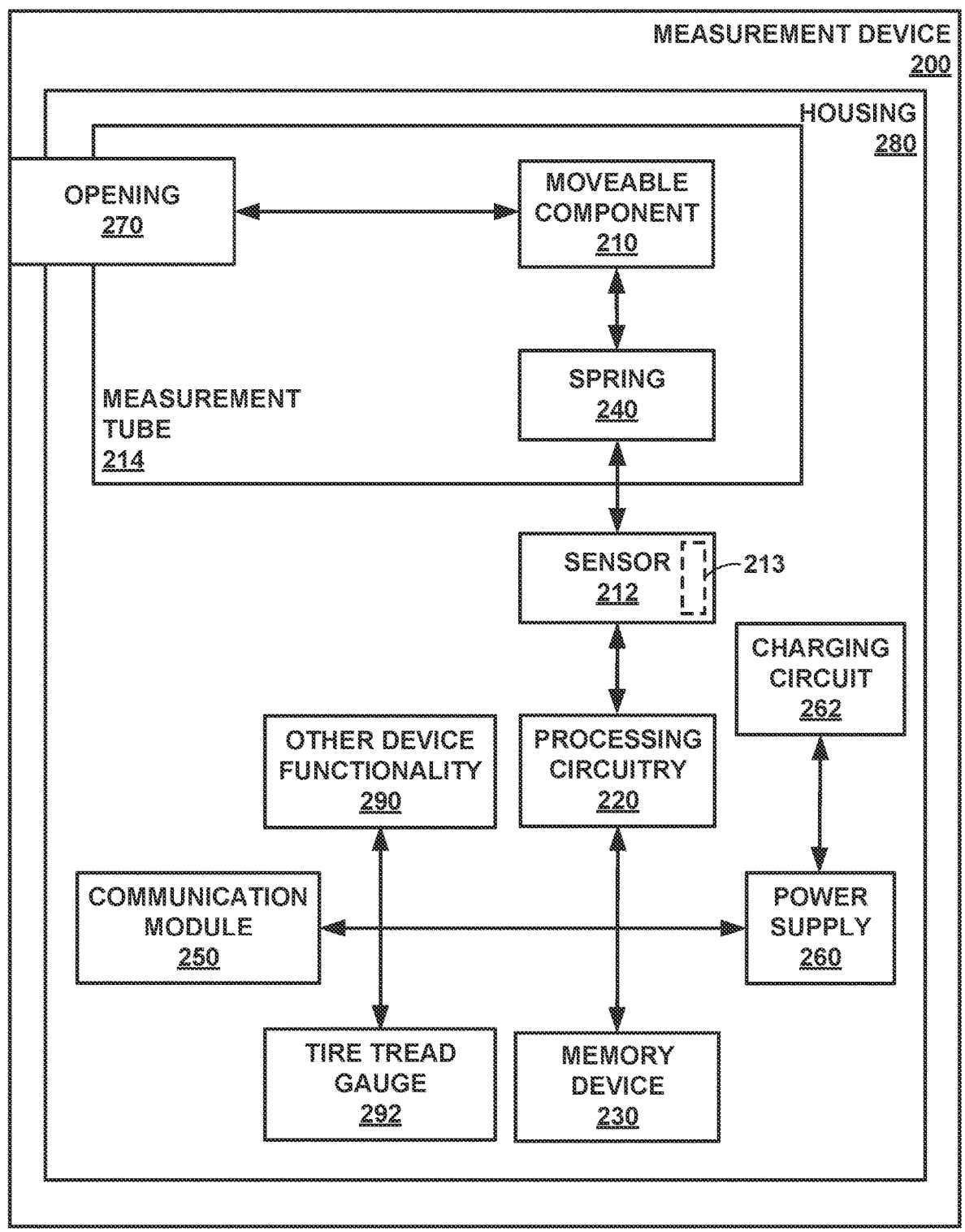
FIG. 2 is a diagram depicting a device for measuring the length of a wear indicator with a sensor, in accordance with some examples of this disclosure.

FIG. 2 is a diagram depicting a device 200 for measuring the length of a wear indicator with a sensor 212, in accordance with some examples of this disclosure. Measurement device 200 (e.g., "device 200") includes moveable component 210, sensor 212, measurement tube 214, processing circuitry 220, memory device 230, spring 240, communication module 250, power supply 260, opening 270, housing 280, other device functionality 290, and tire tread gauge 292.

Device 200 is an example of device 100 shown in FIG. 1. Device 200 may be a handheld device or may be physically attached to a brake assembly of a vehicle, such as an aircraft, a space vehicle such as a satellite or spaceship, a land vehicle such as an automobile, a manned vehicle, an unmanned vehicle such as a drone, a remote-control vehicle, or any suitable vehicle without any pilot or crew on board.

Device 200 may be configured to receive a wear indicator at opening 270. The wear indicator may pass through measurement tube 214 and come in contact with moveable component 210. Measurement tube 214 may be a track for moveable component 210 and spring 240. Housing 280 may form measurement tube 214 with opening 270 at one end of the track. Moveable component 210 and spring 240 may be configured to move along the track (e.g., measurement tube 214).

To measure the length of the wear indicator, the exposed length of the wear indicator may enter measurement tube 214. The displacement of moveable component 210 may be equal to the exposed length of the wear indicator. The displacement of moveable component 210 may be based on contact with the wear indicator. Opening 270 may be formed by a hole in housing 280. Opening 270 can be at least partially surrounded by a portion of housing 280.

Spring 240 may be configured to compress in response to inserting the wear indicator into the measurement tube 214. Moveable component 210 may be configured to apply a compression force to spring 240 in response to opening 270 receiving the wear indicator. Sensor 212 may be configured to generate a signal such as a voltage signal or a current signal based on the compression of spring 240 caused by displacement of moveable component 210. Spring 240 may be configured to reload the moveable component 210 back to the front of measurement tube 214 towards opening 270. In examples in which sensor 212 includes a linear displacement sensor, sensor 212 may include moveable rod 213 configured to move based on displacement of moveable component. In some examples, spring 240 can return moveable rod 213 to a starting position.

For example, processing circuitry 220 may be configured to determine a voltage level of the signal generated by sensor 212, where the voltage level is based on compression of spring 240. Processing circuitry 220 may be further configured to automatically store the determined length to memory device 230. Processing circuitry 220 may also be configured to automatically transmit the determined to an external receiver via communication module 250.

Communication module 250 may output any or all of the collected measurements, determined data, and/or generated alerts to an external receiver (e.g., an external computing device). An external receiver may be part of a smartphone, a tablet, or a computer, such as the avionics bay of an aircraft. Alternatively or additionally, communication module 250 may output the data or generated alerts to a display device, to be observed by, for example, a pilot, driver, or mechanic. Communication module 250 may consist of a hard-wired system, such as wires, USB port, a serial port, or a fiber-optic cable. Additionally or alternatively, communication module 250 may include a wireless communication system, such as Wi-Fi, Bluetooth, radio-frequency identification (RFID), near-field communication (NFC), or any other electromagnetic signal.

Processing circuitry 220 and communication module 250 may be configured to establish a connection with an external receiver, such as a smartphone, tablet, or a router. For example, processing circuitry 220 can establish a Bluetooth connection with a proximate smartphone or a Wi-Fi connection with a proximate router before transmitting data. A smartphone may include a software application for establishing the connection with the communication module 250. The software application may cause the smartphone to display the data received from device 200.

In some examples, the external receiver is a mobile computing device (e.g., a smartphone or tablet). The mobile computing device may create a data file using the data obtained from device 200. The mobile computing device may then be configured to transmit the data file to a server, such as a cloud computing server for data storage.

Processing circuitry 220 may be configured to transmit additional data to the external receiver, such as data indicating the status or performance of device 200. For example, if device 200 has a defect or an error, processing circuitry 220 can transmit information relating to the defect or error. Processing circuitry 220 can also transmit data indicating the status of power supply 260 to the external receiver. Processing circuitry 220 may be configured to transmit the time of a measurement to the external receiver. Processing circuitry 220 can also receive a request for information from the external receiver, and processing circuitry 220 can transmit the requested information to the external receiver.

Power supply 260 delivers electrical power to the components of device 200. Power supply 260 may consist of a battery, such as a lithium-ion battery, any lithium-based chemistry battery, a lead-acid battery, or a connection to an electrical grid. Using a battery as power supply 260 allows for device 200 to be a cordless device. Device 200 may include a button for turning on and off device 200, where power supply 260 supply power to sensor 212, processing circuitry 220, and memory device 230 only when device 200 is turned on. In some examples, power supply 260 includes a rechargeable battery or a reusable battery that is coupled to charging circuit 262. Charging circuit 262 may be configured to wirelessly receive electrical power for charging the rechargeable battery or the reusable battery, or charging circuit 262 can receive electrical power through a wired connection.

Other device functionality 290 may include a tire pressure gauge or tire pressure sensor, a tire tread gauge, a display, and/or any other optional components. A tire pressure gauge may be configured to measure the pressure in a tire using a pressure sensor. A tire tread gauge may include a measurement device to measure the thickness of the tread on a tire. In some examples, other device functionality 290 includes an optional display for presenting data to a user. Processing circuitry 220 may be configured to present a numerical value for the length of the wear indicator to a user via the display.

Figure 3:
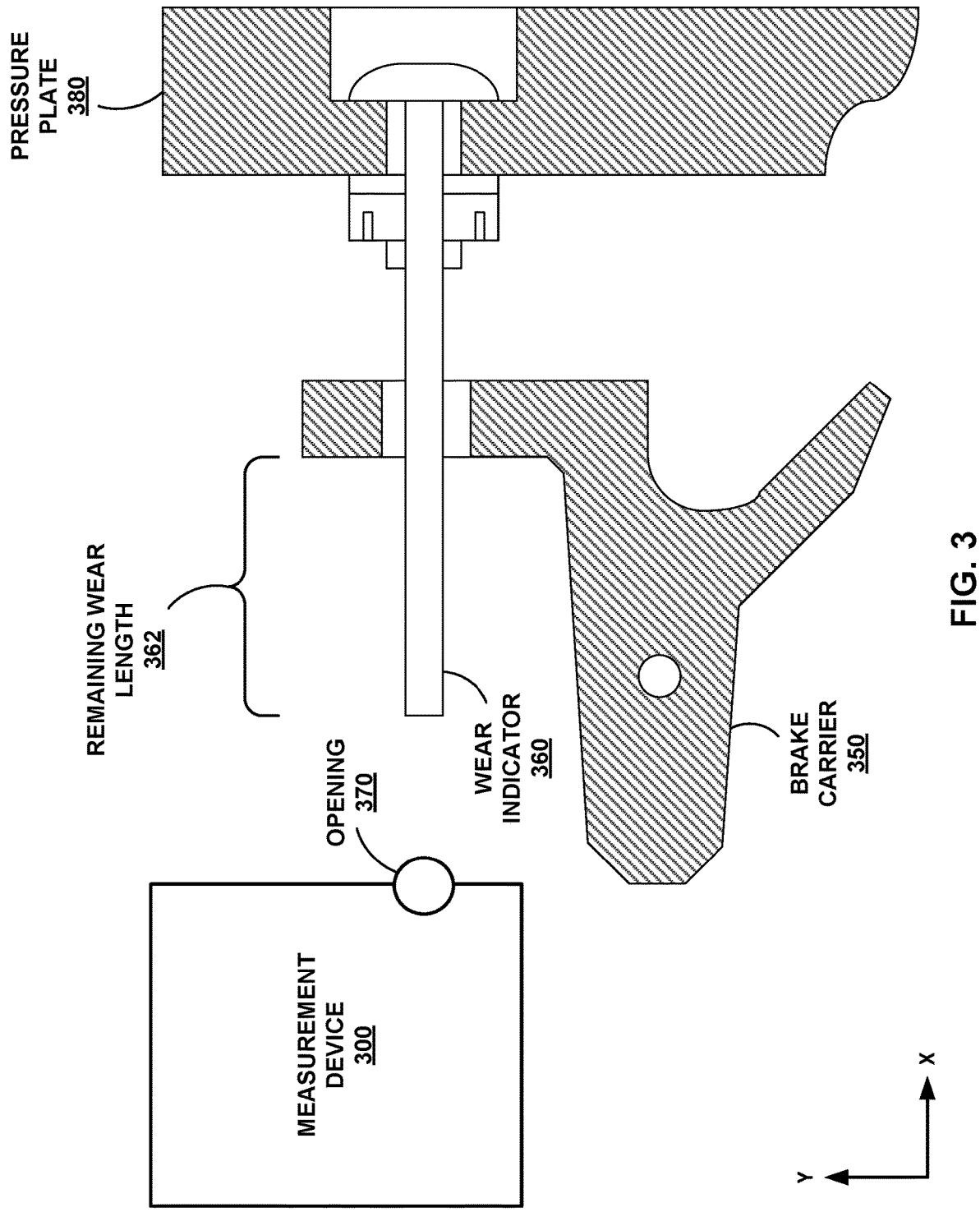
FIG. 3 is a diagram depicting a brake assembly including a wear indicator, in accordance with some examples of this disclosure.

FIG. 3 is a diagram depicting a brake assembly including a wear indicator 360, in accordance with some examples of this disclosure. The brake assembly includes brake carrier 350, wear indicator 360, and pressure plate 380. Pressure plate 380 is configured to move in the x-axis direction with respect to brake carrier 350 as the vehicle's brakes wear down through use over time. Pressure plate 380 is an example of plate 180 shown in FIG. 1. Pressure plate 380 may be attached to a brake lining (e.g., a brake shoe a brake pad) that presses against a rotating component of a wheel to reduce the speed of the rotating component.

Because wear indicator 360 is physically coupled to pressure plate 380, wear indicator 360 likewise moves in the x-axis direction with respect to brake carrier 350. Because wear indicator 360 moves with respect to brake carrier 350, the exposed portion of wear indicator 360, or remaining wear length 362, decreases with use of the brakes. As remaining wear length 362 approaches zero, and the tip or surface of wear indicator 360 approaches the surface of brake carrier 350, the brakes may be nearing the time at which they need to be replaced. When the surface of wear indicator 360 is flush with the surface of brake carrier 350, the useful life of the vehicle's brakes may be over. It may be considered dangerous to continue using the existing brakes when remaining wear length 362 reaches zero, because continued use may result in worse performance.

Wear indicator 360 may be mounted on pressure plate 380 (e.g., by a rivet), which holds the brake lining on the other side of pressure plate 380. Pressure plate 380 may include metal material. Pressure plate 380 can be attached to one or more pads of the brake lining (e.g., a brake shoe a brake pad) that may include steel or carbon. In the example of FIG. 3, wear indicator 360 is attached to pressure plate 380 and protrudes through brake carrier 350. Because wear indicator 360 moves with respect to brake carrier 350, the exposed portion of wear indicator 360, or remaining wear length 362, decreases with use of the brakes. As remaining wear length 362 approaches zero, and the tip or surface of wear indicator 360 approaches the surface of brake carrier 350, the brakes may be nearing the time at which they need to be replaced. When the surface of wear indicator 360 is flush with the surface of brake carrier 350, the lifespan of the vehicle's brakes may be presumed to be over, or may be considered dangerous to continue using, as this may result in brake failure.

Measurement device 300 (e.g., "device 300") is configured to measure remaining wear length 362 of wear indicator 360. A technician can insert wear indicator 360 into opening 370 of device 300 to cause device 300 to record a measurement of length 362. The housing of device 300 may at least partially surround opening 370. The portion of the housing that at least partially surrounds opening 370 may be configured to make contact with a portion of a brake housing, such as brake carrier 350. A technician can measure length 362 by inserting wear indicator 360 into opening 370 and pushing a button on device 300.

Figure 4:
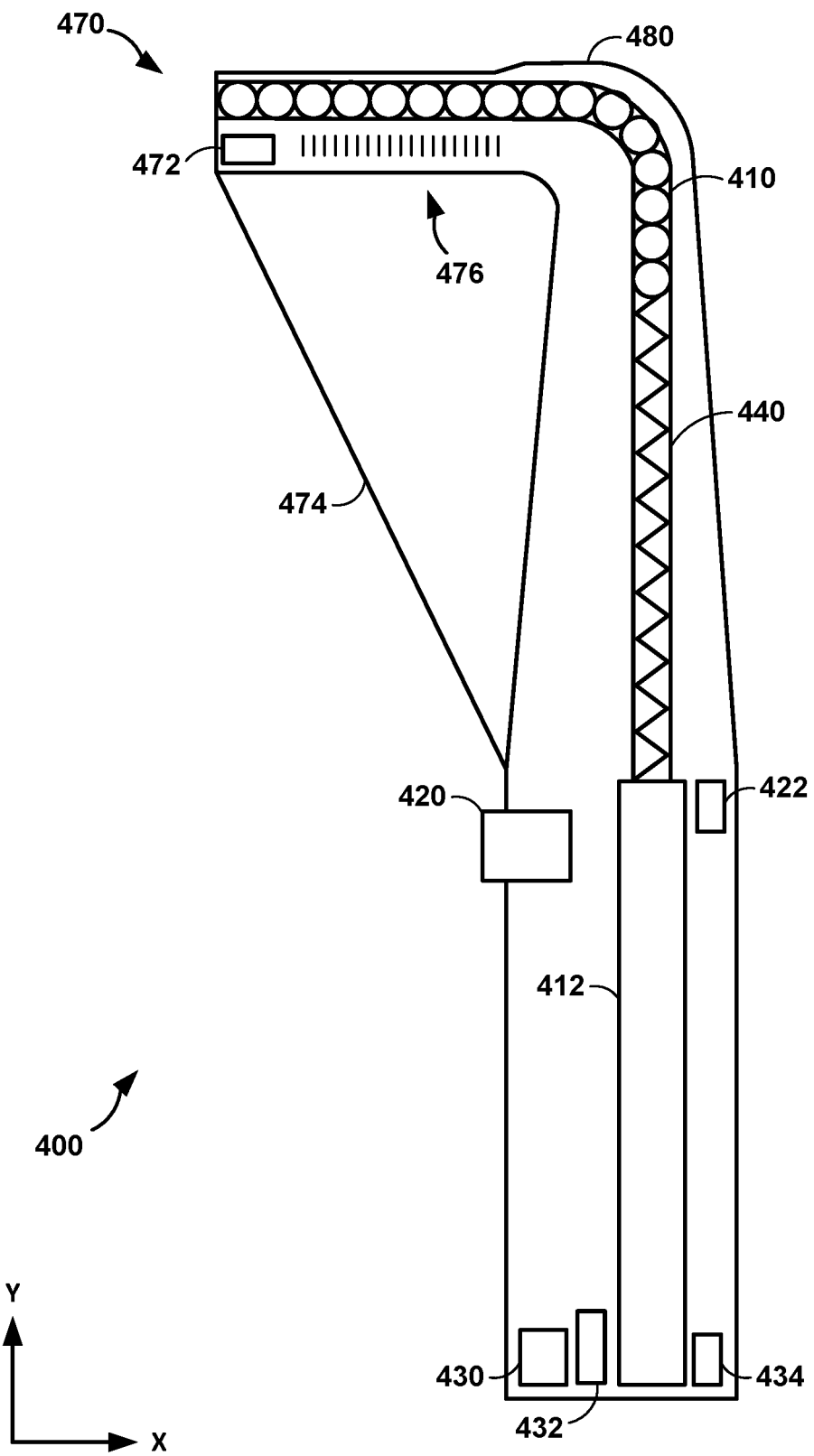
FIG. 4 is a cut-away diagram depicting a device configured to implement techniques of this disclosure.

FIG. 4 is a cut-away diagram depicting a device 400 configured to implement techniques of this disclosure. Device 400 also includes sensor 412, button 420, working status indicator 422, power switch 430, battery indicator 432, light switch 434, opening 470, light 472, flange 474, markings 476, and housing 480. Bearings 410 are an example of moveable components 110 and 210 shown in FIGS. 1 and 2. Bearings 410 may include metal bearings, such as metal balls (e.g., steel balls).

Bearings 410 and spring 440 are positioned in a measurement tube surrounded by housing 480. The measurement may also be referred to as a "track" for the movement of bearings 410 and for the displacement of spring 440. As a wear indicator enters the measurement tube through opening 470 and displaces bearings 410, spring 440 may compress or contract. The wear indicator may displace bearings 410 by contacting the bearing that is closest to opening 470 and pushing the closest bearing back into the measurement tube towards spring 440. Bearings 410 may slide or roll through the measurement tube as the wear indicator is inserting into opening 470. Bearings 410 may transmit the movement of the wear indicator to sensor 412. When the wear indicator is removed from the measurement tube, spring 440 may expand to its original state. Sensor 412 is configured to detect the displacement of spring 440 and can generate a signal based on the displacement. For example, sensor 412 may include pressure sensor configured to output the signal based on the compression or expansion of spring 412. Additionally or alternatively, sensor 412 may include a linear displacement sensor (e.g., an LVDT) configured to output the signal based on displacement of a moveable rod of sensor 412 caused by displacement of bearings 410, where spring 440 can be configured to return the moveable rod of sensor 412 to a starting position.

Button 420 may be used to control the operation of device 400. For example, a user can press button 420 to cause device 400 to perform, record, and/or store a measurement of a wear indicator when housing 480 is flush with the brake carrier. Button 420 may also provide additional functionality such as causing the transmission of data to an external receiver. In some examples, transmitting data is an automatic operation performed by device 400 after recording a measurement.

Device 400 may also include switches 430 and 434 near an end of device 400 that is opposite opening 470. power switch 430 for turning device 400 on and off and light switch 434 for turning light 472 on and off. Light 472 is positioned near opening 470 (e.g., with one or two centimeters of an edge of opening 470). A user can point light 472 towards a wear indicator. Light 472 may be useful in dark conditions for providing light to find a wear indicator. Light 472 and indicators 422 and 432 may include light emitting diodes or any other lights.

Indicators 422 and 432 may include lights that indicate the status of device 400. Working status indicator 422 can provide a color light to indicate whether a measurement is or has been recorded and/or transmitted. Working status indicator 422 may be configured to flash, pulse, or provide a steady light to indicate the working status of device 400. The operation of working status indicator 422 can indicate the operation and status of device 200 to a user. Battery status indicator 432 can provide a color light indicating the status of the power supply of device 400. Battery status indicator 432 may be configured to flash, pulse, or provide a steady light to indicate the status of the power supply of device 400.

Housing 480 surrounds the measurement tube, bearings 410, sensor 412, and spring 440. Housing 480 at least partially surrounds button 420, switches 430 and 434, indicators 422 and 432, and opening 470. Flange 474 may be part of housing 480 that provides structural support for device 400. In the example of FIG. 4, device 400 includes a ninety-degree bend, such that the measurement tube has a first portion extending the y-axis direction away from sensor 412 and a second portion extending in the x-axis direction to opening 470. Flange 474 supports the bend in device 400 to prevent device 400 from breaking due to a force applied near opening 470.

In the example shown in FIG. 4, housing 480 includes markings 476 so that a user can manually measure the displacement of bearings 410 along the track or measurement tube. Markings 476 may include hash marks or gradient lines similar to the lines on a ruler or a tape measure. The portion of housing 480 that includes markings 476 (e.g., the neck of housing 480) can include transparent material so that the user can see how far the last bearing of bearings 410 has displaced. The user can manually determine the length of the wear indicator based on the marking of markings 476 that lines up with the last bearing of bearings 410. Device 400 may also include text, numbers, or measurements printed on housing 480 near markings 476 so that the user can determine the wear indicator length associated with each marking of markings 476. A user can manually measure the length of a wear indicator using markings 476 in the event of a failure of the electronic components of device 400.

The bend in the measurement tube may reduce the length of device 400 in the y-axis direction. This reduction in length may make it relatively easy for a technician to use device 400 in tight spaces. The reduction in length may also make it relatively easy to insert a wear indicator into opening 470. The bend may help with clearance issues, and the bend may also device 400 to fit around corners. Bearings 410 can transfer the measurement movement ninety degrees. Thus, the working length of device 400 can be significantly reduced. The bend in device 400 extends the usefulness of device 400. For example, in examples in which aircraft is fully loaded and the operator needs to measure a wear indicator in a very narrow space. Because of this shape and design, a handheld version of device 400 can work on all types of aircraft.

Figure 5:
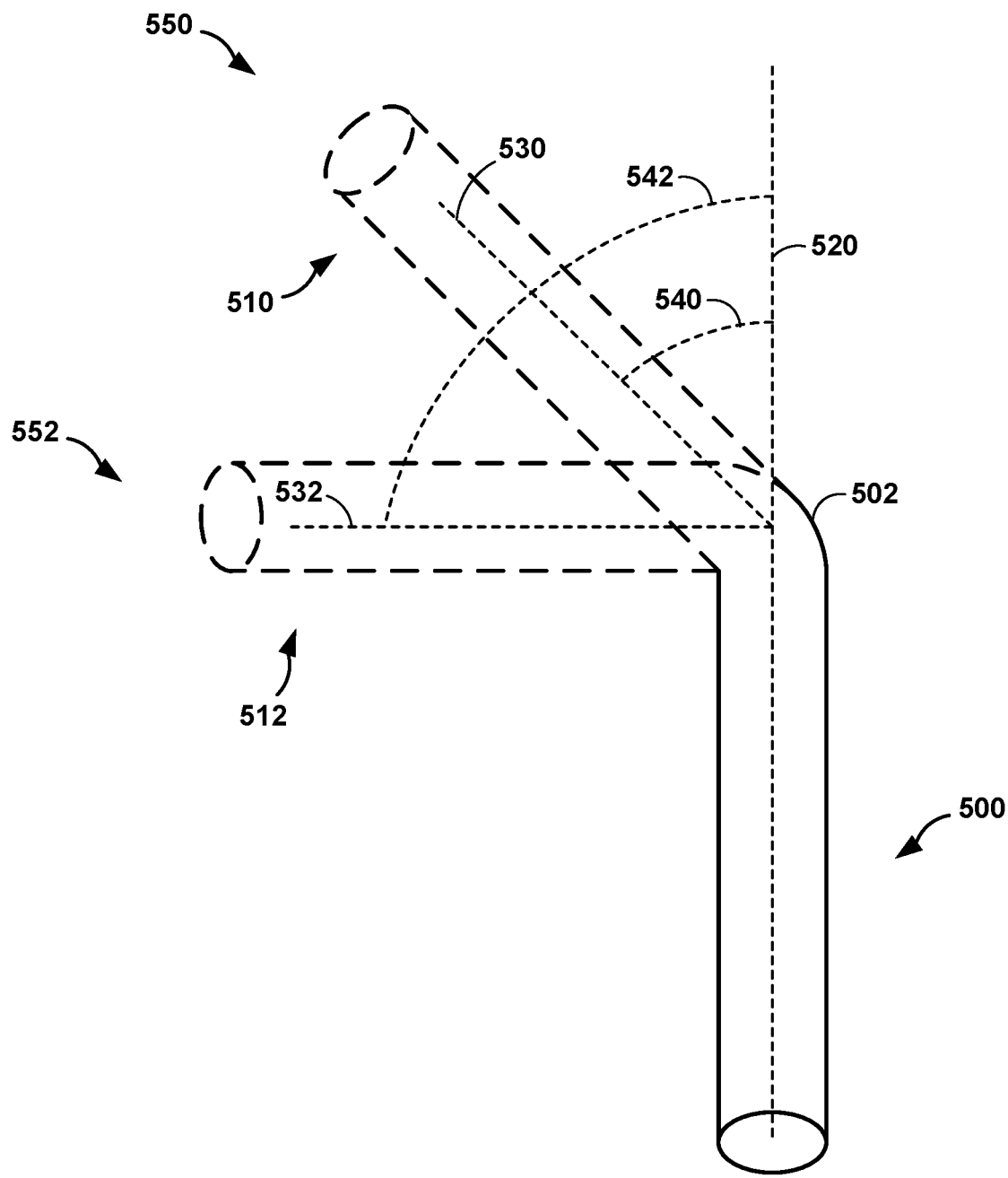
FIG. 5 is a diagram depicting a two possible bends in a measurement tube.

FIG. 5 is a diagram depicting a two possible bends in a measurement tube 500. Measurement tube 500 extends along line 520 in a y-axis direction before bending at point 502. Possible measurement tube 510 has a bend at point 502 with angle 540 of forty-five degrees. Opening 550 of possible measurement tube 510 points in a direction along line 530 that is offset by forty-five degrees from the y-axis direction. Possible measurement tube 512 has a bend at point 502 with angle 542 of ninety degrees. Opening 552 of possible measurement tube 512 points in a direction along line 532 that is offset by ninety degrees from the y-axis direction (e.g., pointing the x-axis direction).

In some examples, a device of this disclosure includes a bend of approximately forty-five degrees (e.g., possible measurement tube 510) or approximately ninety degrees (e.g., possible measurement tube 512). The device may include a bend with an angle of at least thirty, forty, fifty, sixty, or seventy degrees. The device may have a bend with an angle between forty degrees and one hundred and twenty degrees, between sixty degrees and one hundred degrees, or between seventy degrees and one hundred degrees.

Figure 6:
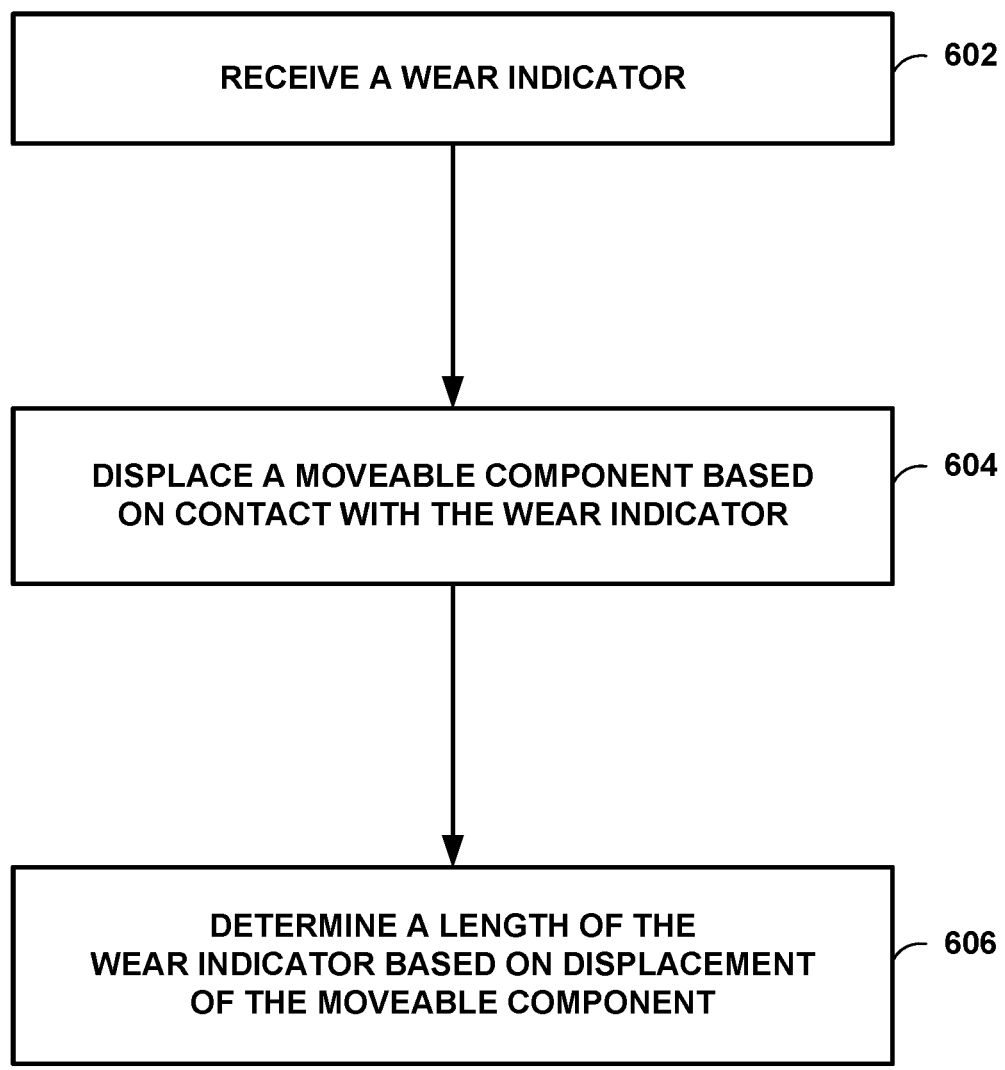
FIG. 6 is a flowchart depicting an example process of measuring the length of a wear indicator, in accordance with some examples of this disclosure.

FIG. 6 is a flowchart depicting an example process of measuring the length of a wear indicator, in accordance with some examples of this disclosure. The technique of FIG. 6 is described with reference to device 400 of FIG. 4, although devices 100, 200, and 300 may also perform similar techniques.

In the example of FIG. 6, device 400 receives a wear indicator at opening 470 (602). The wear indicator enters the measurement tube of device 400 through opening 470. The wear indicator displaces bearings 410 based on contact between the wear indicator and bearings 410 (604). The displacement of bearings 410 causes spring 440 to compress. Sensor 412 can generate a signal based on the compression state of spring 440, which is caused by the displacement of bearings 410.

In the example of FIG. 6, the processing circuitry of device 400 determines the length of the wear indicator based on the displacement of bearings 410 (606). The processing circuitry may be configured to receive a signal generated by sensor 412 based on the displacement of bearings 410. The processing circuitry can use the signal to determine the length of the wear indicator based on a lookup table or instructions stored to a memory device. The processing circuitry may then be configured to transmit, via a communication module, data indicating the determined length to an external receiver. The processing circuitry may be able to transmit the data to the external receiver via a Bluetooth connection, a Wi-Fi connection, and/or a cellular network.

The following numbered examples demonstrate one or more aspects of the disclosure.

Example 1

In a first example, a device is for measuring a length of a wear indicator on a brake assembly. The device includes a moveable component configured to move based on contact with the wear indicator. The device also includes a sensor configured to detect a displacement of the moveable component. The device further includes processing circuitry configured to determine the length of the wear indicator based on the displacement of the moveable component detected by the sensor.

Example 2

The device of example 1, further including a measurement tube including a track and an opening.

Example 3

The device of example 2, where the opening is configured to receive the wear indicator.

Example 4

The device of example 2 or example 3, further including a spring configured to compress in response to inserting the wear indicator into the measurement tube.

Example 5

The device of examples 2-4 or any combination thereof, where the spring and moveable component are configured to move along the track.

Example 6

The device of examples 1-5 or any combination thereof, further including a spring configured to compress in response to the displacement of the moveable component.

Example 7

The device of examples 1-6 or any combination thereof, where the sensor is configured to generate a signal based on compression or expansion of the spring caused by displacement of the moveable component.

Example 8

The device of examples 1-7 or any combination thereof, where the processing circuitry is configured to determine the length of the wear indicator based on the signal.

Example 9

The device of examples 1-8 or any combination thereof, further including a light positioned near the opening.

Example 10

The device of example 9, further including a light switch for turning on or off the light.

Example 11

The device of examples 1-10 or any combination thereof, where the moveable component includes a plurality of bearings.

Example 12

The device of example 11, where the spring is configured to compress or expand based on movement of the plurality of bearings.

Example 13

The device of examples 1-12 or any combination thereof, further including a housing that forms a track for the plurality of bearings and the spring.

Example 14

The device of examples 1-13 or any combination thereof, wherein the housing and the track include a bend of at least forty-five degrees.

Example 15A

The device of examples 1-14 or any combination thereof, further including a housing that forms an opening configured to receive the wear indicator.

Example 15B

The device of examples 1-15A or any combination thereof, where a portion of the housing at least partially surrounds the opening, and the portion of the housing is configured to make contact with the brake assembly when the opening receives the wear indicator.

Example 16

The device of examples 1-15B or any combination thereof, where the device is a handheld, cordless, and/or portable device.

Example 17

The device of examples 1-16 or any combination thereof, further including a battery and a charging circuit coupled to the battery and configured to wirelessly receive electrical power for charging the battery.

Example 18

The device of examples 1-17 or any combination thereof, where the brake assembly is part of a wheel assembly that includes a tire.

Example 19

The device of example 18, further including a tire pressure sensor configured to measure a pressure of the tire.

Example 20

The device of example 18 or example 19, further including a tire tread gauge configured to measure a tread of the tire.

Example 21

The device of examples 1-20 or any combination thereof, where the sensor includes a linear displacement sensor including a moveable rod configured to move based on the displacement of the moveable component.

Example 22

The device of example 21, where the linear displacement sensor is configured to generate a signal based on a displacement of the moveable rod.

Example 23

The device of example 22, where the spring is configured to return the moveable rod to a starting position.

Example 24

A device includes means for measuring a length of a wear indicator on a brake assembly. The device also includes means for moving based on contact with the wear indicator and means for detecting a displacement of the moveable component. In addition, the device includes means for determining the length of the wear indicator based on the displacement of the moveable component detected by the sensor.

Example 25

The device of example 24, further including means for compressing in response to the displacement of the means for moving.

Example 26

The device of example 25, where the means for detecting the displacement of the means for moving includes means for generating a signal based on compression or expansion of the means for compressing.

Example 27

The device of examples 24-26 or any combination thereof, further including means for wirelessly receiving electrical power for a charging a battery.

Example 28

The device of examples 24-27 or any combination thereof, further including means for measuring a pressure of a tire.

Example 29

The device of examples 24-28 or any combination thereof, further including means for measuring a tread of a tire.

Example 30

The device of examples 24-29 or any combination thereof, further including means for performing the functionality of examples 1-23 or any combination thereof.

Example 31

A method includes moving based on contact with the wear indicator and detecting a displacement of the moveable component. In addition, the method includes determining the length of the wear indicator based on the displacement of the moveable component detected by the sensor.

Example 32

A method includes receiving a wear indicator. The method also includes displacing a moveable component based on contact with the wear indicator. In addition, the method includes determining the length of the wear indicator based on the displacement of the moveable component.

Example 33

The method of example 31 or example 32, further including means for compressing in response to the displacement of the means for moving.

Example 34

The method of example 33, where detecting the displacement of the means for moving includes generating a signal based on compression or expansion of the means for compressing.

Example 35

The method of examples 31-34 or any combination thereof, further including wirelessly receiving electrical power for a charging a battery.

Example 36

The method of examples 31-35 or any combination thereof, further including measuring a pressure of a tire.

Example 37

The method of examples 31-36 or any combination thereof, further including measuring a tread of a tire.

Example 38

The method of examples 31-37 or any combination thereof, further including performing the functionality of examples 1-23 or any combination thereof.

The techniques of this disclosure may be implemented in a device or article of manufacture including a computer-readable storage medium. The term "processing circuitry," as used herein may refer to any of the foregoing structure or any other structure suitable for processing program code and/or data or otherwise implementing the techniques described herein. Elements of processing circuitry 120 and 220 be implemented in any of a variety of types of solid state circuit elements, such as CPUs, CPU cores, GPUs, digital signal processors (DSPs), application-specific integrated circuits (ASICs), a mixed-signal integrated circuits, field programmable gate arrays (FPGAs), microcontrollers, programmable logic controllers (PLCs), programmable logic device (PLDs), complex PLDs (CPLDs), a system on a chip (SoC), any subsection of any of the above, an interconnected or distributed combination of any of the above, or any other integrated or discrete logic circuitry, or any other type of component or one or more components capable of being configured in accordance with any of the examples disclosed herein.

Devices 100, 200, 300, and 400 may include one or more memory devices, such as memory devices 130 and 230, that include any volatile or non-volatile media, such as a RAM, ROM, non-volatile RAM (NVRAM), electrically erasable programmable ROM (EEPROM), flash memory, and the like. Memory devices 130 and 230 may store computer-readable instructions that, when executed by processing circuitry, cause the processing circuitry to implement the techniques attributed herein to processing circuitry 120 and 220.

Elements of processing circuitry 120 and 220 and/or memory devices 130 and 230 may be programmed with various forms of software. The processing circuitry and/or the transceiver may be implemented at least in part as, or include, one or more executable applications, application modules, libraries, classes, methods, objects, routines, subroutines, firmware, and/or embedded code, for example. Elements of processing circuitry 120 and 220 and/or memory devices 130 and 230 as in any of the examples herein may be implemented as a device, a system, an apparatus, and may embody or implement a method of determining an estimated altitude of a melting layer.

The techniques of this disclosure may be implemented in a wide variety of computing devices. Any components, modules or units have been described to emphasize functional aspects and does not necessarily require realization by different hardware units. The techniques described herein may be implemented in hardware, software, firmware, or any combination thereof. Any features described as modules, units or components may be implemented together in an integrated logic device or separately as discrete but interoperable logic devices. In some cases, various features may be implemented as an integrated circuit device, such as an integrated circuit chip or chipset.

Various examples of the disclosure have been described. Any combination of the described systems, operations, or functions is contemplated. These and other examples are within the scope of the following claims.

What is claimed is:

1. A device for measuring a length of a wear indicator on a brake assembly, the device comprising:
   a housing defining a track;
   a moveable component comprising a plurality of bearings configured to move along the track based on contact with the wear indicator;
   a sensor configured to detect a displacement of the moveable component; and
   processing circuitry configured to determine the length of the wear indicator based on the displacement of the moveable component detected by the sensor.

2. The device of claim 1, further comprising:
   a measurement tube including the track and an opening, wherein the opening is configured to receive the wear indicator; and
   a spring configured to compress in response to inserting the wear indicator into the measurement tube, wherein the spring and the moveable component are configured to move along the track.

3. The device of claim 2,
   wherein the sensor is configured to generate a signal based on compression or expansion of the spring caused by displacement of the moveable component, and
   wherein the processing circuitry is configured to determine the length of the wear indicator based on the signal.

4. The device of claim 2, further comprising:
   a light positioned near the opening; and
   a light switch for turning on or off the light.

5. The device of claim 2,
   wherein a portion of the housing at least partially surrounds the opening, and wherein the portion of the housing is configured to make contact with the brake assembly when the opening receives the wear indicator.

6. The device of claim 1, wherein a spring is configured to compress or expand based on movement of the plurality of bearings.

7. The device of claim 1, wherein the track includes a bend of at least forty-five degrees.

8. The device of claim 1, wherein the device is a handheld, cordless device.

9. The device of claim 1, further comprising:
a battery; and
a charging circuit coupled to the battery and configured to wirelessly receive electrical power for charging the battery.

10. The device of claim 1, wherein the brake assembly is part of a wheel assembly that includes a tire, the device further comprising:
a tire pressure sensor configured to measure a pressure of the tire; or
a tire tread gauge configured to measure a tread of the tire.

11. The device of claim 1,
wherein the sensor includes a linear displacement sensor including a moveable rod configured to move based on the displacement of the moveable component, and
wherein the linear displacement sensor is configured to generate a signal based on a displacement of the moveable rod.

12. A device comprising:
means for moving a plurality of bearings along a track based on contact with a wear indicator on a brake assembly;
means for detecting a displacement of the means for moving; and
means for determining the length of the wear indicator based on the displacement of the means for moving.

13. The device of claim 12, further comprising means for compressing in response to the displacement of the means for moving,
wherein the means for detecting the displacement of the means for moving comprises means for generating a signal based on compression or expansion of the means for compressing.

14. The device of claim 12, further comprising means for wirelessly receiving electrical power for a charging a battery.

15. The device of claim 12, further comprising means for measuring a pressure of a tire.

16. A device for measuring a length of a wear indicator on a brake assembly, the device comprising:
a plurality of bearings configured to move based on contact with the wear indicator;
a spring configured to compress or expand based on displacement of the plurality of the bearings;
a housing, wherein the housing forms:
a track for the plurality of bearings and the spring; and
an opening at one end of the track, wherein the opening is configured to receive the wear indicator;
a sensor configured to generate a signal based on compression or expansion of the spring caused the displacement of the plurality of the bearings; and
processing circuitry configured to determine the length of the wear indicator based on the signal.

17. The device of claim 16, wherein the housing and the track include a bend of at least forty-five degrees.

18. The device of claim 16,
wherein a portion of the housing at least partially surrounds the opening, and
wherein the portion of the housing is configured to make contact with the brake assembly when the opening receives the wear indicator.

* * * * *